Feb. 13, 1951 J. LAMMERS 2,541,426

RECORDING DEVICE FOR SHIP'S TELEGRAPH

Filed Jan. 29, 1949 5 Sheets-Sheet 1

INVENTOR.
Johannes LAMMERS

BY Heinrich Hochschild

Attorney

Feb. 13, 1951 J. LAMMERS 2,541,426

RECORDING DEVICE FOR SHIP'S TELEGRAPH

Filed Jan. 29, 1949 5 Sheets-Sheet 2

INVENTOR.

Johannes LAMMERS

BY

Attorney

Feb. 13, 1951 J. LAMMERS 2,541,426

RECORDING DEVICE FOR SHIP'S TELEGRAPH

Filed Jan. 29, 1949 5 Sheets-Sheet 3

INVENTOR.

Johannes LAMMERS

BY [signature]

Attorney

Feb. 13, 1951 J. LAMMERS 2,541,426

RECORDING DEVICE FOR SHIP'S TELEGRAPH

Filed Jan. 29, 1949 5 Sheets-Sheet 4

*INVENTOR.*

Johannes LAMMERS

*BY* [signature]

Attorney

Feb. 13, 1951 J. LAMMERS 2,541,426

RECORDING DEVICE FOR SHIP'S TELEGRAPH

Filed Jan. 29, 1949 5 Sheets-Sheet 5

INVENTOR.

Johannes LAMMERS

BY Heinrich Koehnsdorfer

Attorney

Patented Feb. 13, 1951 2,541,426

UNITED STATES PATENT OFFICE 2,541,426

RECORDING DEVICE FOR SHIPS' TELEGRAPHS

Johannes Lammers, Delft, Netherlands, assignor to Dok- en Werf-Maatschappij Wilton-Fijenoord N. V., Rotterdam, Netherlands, a company of the Netherlands Application January 29, 1949, Serial No. 73,597
In the Netherlands January 30, 1948

17 Claims. (Cl. 346—17)

The invention is concerned with a recording device including a recorder and a command carrier carrying signs reproduceable by the recorder and representing the commands transmitted from the bridge telegraph to the engine room for executing maneuvers, commands which are indicated on the bridge telegraph, and further representing the responses or command repeats repeated from the engine room telegraph, indicated thereon and transmitted to the bridge telegraph.

It is a primary object of the invention to derive the energy for the operation of the recording device from a source independent of the drive of the telegraphs, to utilize, however, the motion of a moved part of the telegraphs or of the transmission therebetween for controlling the operation of the recording device.

It is a further object of the invention to make possible the control of the movement of the recording device from any convenient organ of the ship's telegraphs such as from the command levers or indicators of both telegraphs, or the command lever and command repeat lever of either telegraph, or any member thereof moved for transmitting the commands or indicating or showing the commands given or repeated.

A still further object of the invention is the development of a recording device with control and drive such that the operation of the device sets in at the moment when one or the other of the telegraphs starts its operation, and, when the setting of the telegraph has been completed and its indicator has reached the desired command position, a sign representing the command and operated under the control of the telegraph movement will be brought by a sign carrier into recording position, will be recorded and the device thereon reset into its original rest position.

A still further object of the invention is a recording device which automatically, on operation of either telegraph, records the commands and command repeats in their actual or historical order, with the exclusion of any confusion in the recording.

It is thus a further object of the invention to make the recording device as to its location independent of the bridge telegraph or the engine room telegraph so that the recording device of the invention may be installed at any convenient place on the ship, thus for instance in the map or navigation room. The device may be assembled and mounted in a closed watertight compartment or housing, inaccessible to unauthorized persons.

The telegraphs to which the recording device of the invention is applied may be of any conventional or convenient type. Both telegraphs, as conventional, may thus be provided each with a dial graduated so as to mark the various positions corresponding to the various commands or maneuvers, and with an indicator adapted to be shifted over and set into any of the various positions so as to indicate the respective command given or received.

The control motion for the recording device will in the embodiment as hereinafter exemplified be derived from the movements of these indicators.

In this embodiment an appropriate recorder such as a photographic camera or a printer may be used for individually recording the commands, or signs which represent the commands. The use of a photographic camera for this purpose is advantageous since a film strip cannot easily be tampered with. Several objects, instruments, or data placed into the image field of the camera may simultaneously be recorded on the film, such as a date and time keeping watch or time piece with seconds hand, so that the precise time of any recording may be taken and also its number by means of a counter, registering the number of exposures for instance. Supervision of the ship's speed maneuvers will therefore be very simple since the order or sequence and the precise time of the individual maneuvers will become readable from the record or film. Additional secondary data may also be recorded, for instance the speed of the engine by placing into the image field of the camera a tachometer coupled with the engine shaft.

Preferably a small-film camera is used. Thus, when employing a 16 mm. small-film, 4000 signals and countersignals may be recorded before reloading of the camera will become necessary. With an 8 mm. small-film, this number will be doubled at equal length of the film.

The recording device of the invention, for recording in their sequence the commands or signals transmitted from the bridge telegraph and the command repeats or counter-signals transmitted from the engine room telegraph, comprises, in addition to the recorder, a command carrier carrying signs reproduceable by the recorder and representing the commands or signals and command repeats or countersignals. A drive is provided for driving the carrier and thus bringing the signs successively into recording position, such as before a printing platen or into the image field of a camera. Control means will, on movement of either telegraph, or its indicator, start the drive.

With completion of the indicator movement, when the indicator has reached the desired command position, and when the corresponding sign will have reached the recording position, the control means will actuate the recorder, and thereon reset the drive and the control means into their original rest position.

The control means include apparatus, hereinafter termed "step governors," members which, coupled with the bridge telegraph and the engine room telegraph, follow the steps of the telegraph indicators. Control circuits are connected to these step governors which control the drive of the sign carrier and the mechanism for actuating the recorder. Step followers, apparatus responsive to the step controllers are connected to the control circuits and are operated under the control of the step governors. These step followers, when their respective indicator has reached the desired command position and the corresponding sign on the command or sign carrier has been brought by the drive into recording position, cause the control means to actuate the recorder and thereon the resetting of the recorder for the next recording, and of the drive and the control means into the original rest position.

The command or sign carrier will conveniently be a rotary disc or drum carrying on its circumference the various signs which represent the various signals and counter-signals and which are to be advanced into recording position such as the image field and the focus of the camera.

In order to limit the recording or exposure to one sign at a time, a screen may be disposed in the image field and in front of the rotary sign carrier with a window of a size to permit exposure of only one sign.

The drive of the sign carrier is derived from a motor continuously running during the recording cycle.

In a further development of the invention, a gearing, provided between motor and sign carrier, brings the signs successively into the recording position, opposite the printing platen or into focus with the camera, and arrests them in this position transitorily during the continuous operation of the drive.

As such an intermittent motion drive, a Maltese or Geneva gearing may be employed with a transmission ratio of the gearing in relation to the speed of the drive such that, during the operation of the drive, each sign in succession is arrested for a length of time exceeding the time necessitated by the recorder for the recording operation.

In the recording device of the invention, all commands or maneuvers will be recorded in their correct sequence. Thus, for instance, when a maneuver is transmitted from the engine room telegraph, immediately after the maneuver had been transmitted from the bridge telegraph, both, command and command repeat will be recorded in their correct order. Additionally, means may be provided to ensure that the engine maneuvers can be recorded only after they had actually been executed.

Other objects and features of the invention will become apparent as the now following specific description proceeds in which the nature of the invention will be more fully described with reference to the accompanying drawings which form part of this specification and which by way of example illustrate embodiments of the invention. It will be readily understood however that the drawings are intended to be illustrative of the invention but not limitative of its scope and that the invention may be embodied in other forms without departing from the principle underlying the invention and the ambit of the appended claims.

Figure 1:
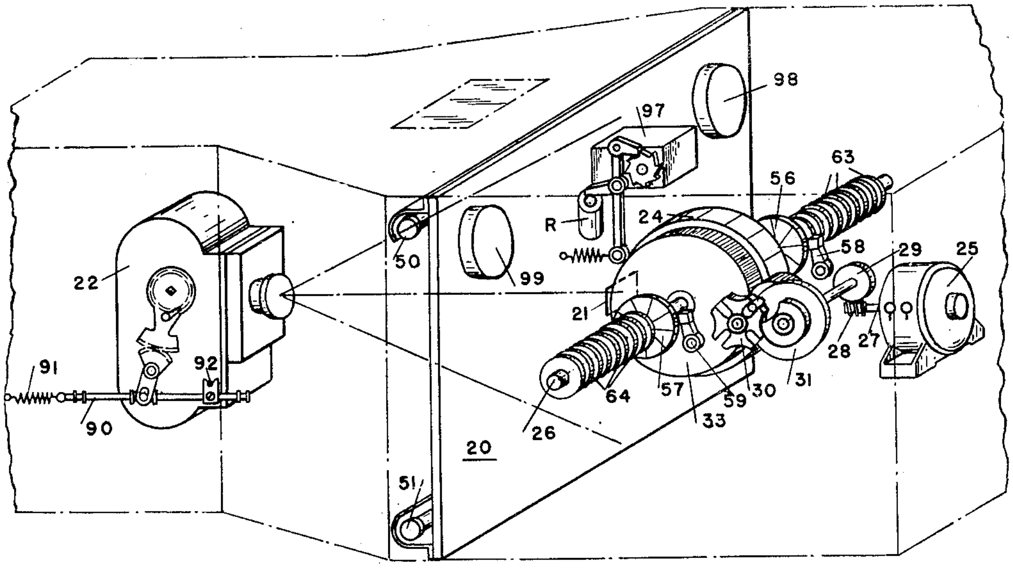
Fig. 1 is an isometric perspective of an arrangement of the sign carrier with its two step follower contact drums and its drive and with a photographic camera with shutter actuating and resetting means and film advancing means, the whole mechanism being shown diagrammatically.
Figure 6:
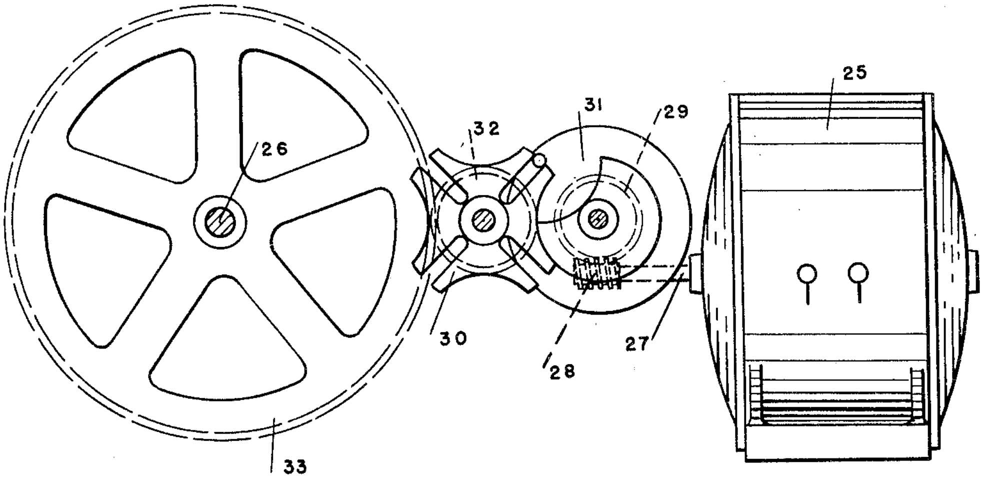
Fig. 6 is a front view on an enlarged scale of the carrier drive with intermittent motion gearing.

The bridge telegraph and the engine room telegraph are both of any conventional type and therefore not shown in detail on the drawings. The bridge telegraph is generally designated by 11, the engine room telegraph by 12. 13 is the dial of the bridge telegraph, 14 its command lever or indicator, 15 is a second hand indicating the commands repeated from the engine room. 16 is the dial of the engine room telegraph, 17 the hand which shows the commands transmitted from the bridge and 18 the indicator which shows by its position on the dial the command repeats which are being transmitted to the bridge. The transmission between the telegraphs, which also may be of any conventional type is not shown in the drawings.

In order to avoid crowding of the drawings, the various command positions on the dials and on the signal carrier are represented in the drawings and in the following description by numerals, the commands transmitted from the bridge telegraph by Roman numerals I–IX and the corresponding commands transmitted from the engine room telegraph by Arabic numerals 1–9.

The scheme of the signs representing the commands thus is as follows:

| Bridge | | Engine Room |
|---|---|---|
| IX | Full Speed Ahead | 9 |
| VIII | Half Speed Ahead | 8 |
| VII | Slow Ahead | 7 |
| VI | Very Slow Ahead | 6 |
| V | Stop | 5 |
| IV | Stand By | 4 |
| III | Slow Astern | 3 |
| II | Half Speed Astern | 2 |
| I | Full Speed Astern | 1 |

Figure 3:
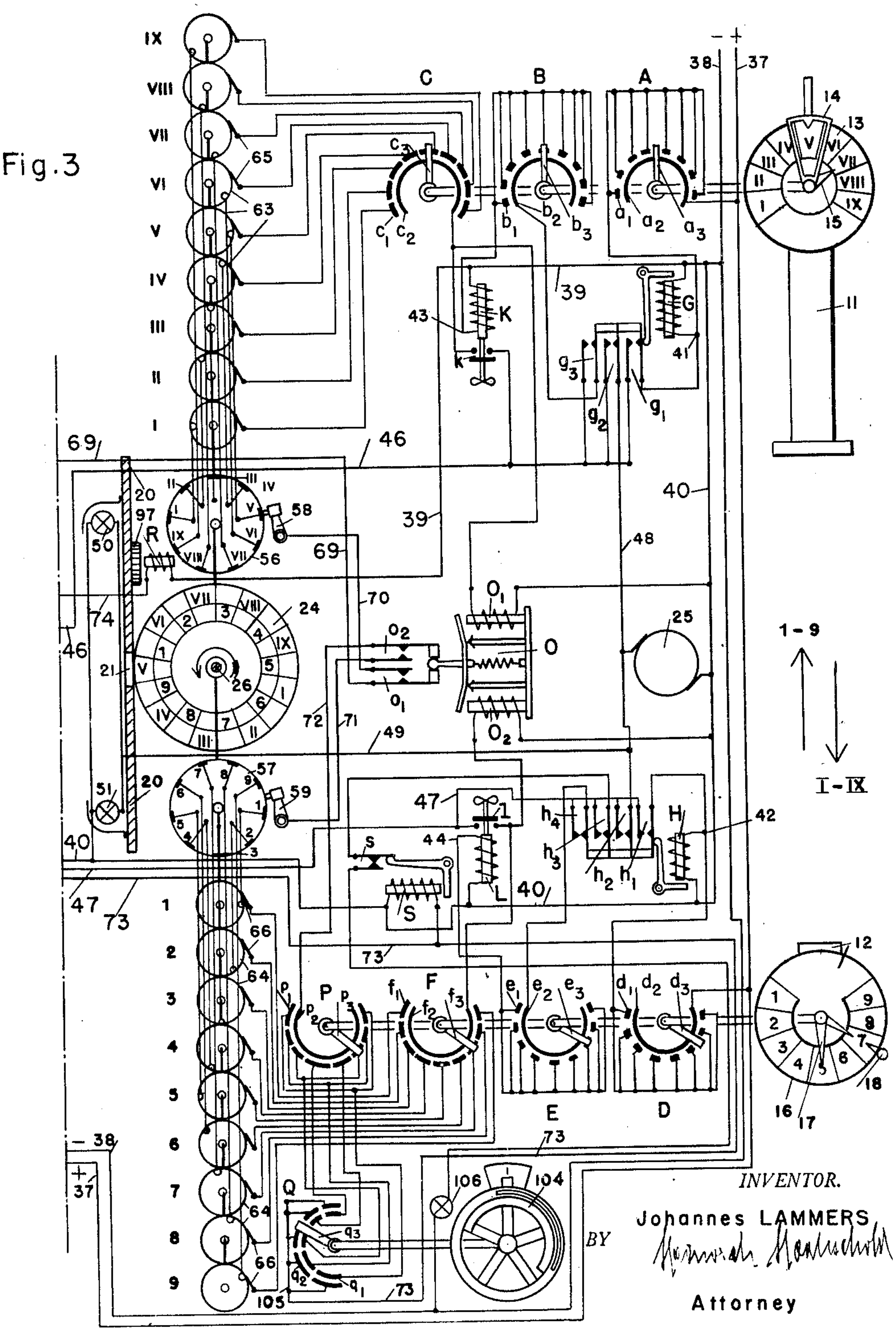
Figure 7:
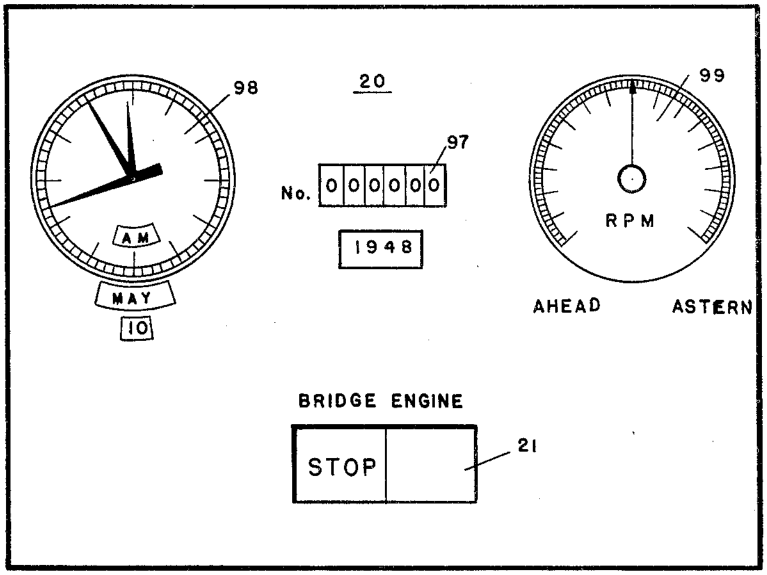
Fig. 7 is a detailed front view of the screen, disposed in Fig. 1 between command carrier and photographic camera, and serving as an instrument board.
Figure 4:
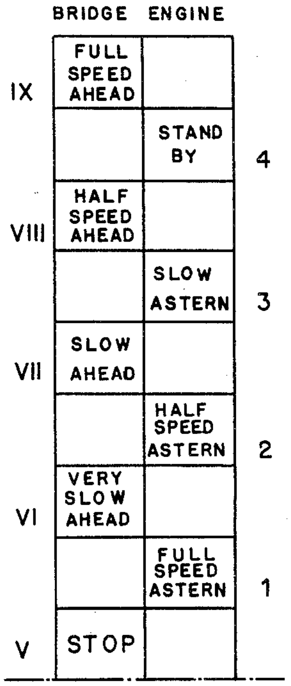
Figs. 4 and 5 are the contiguous parts of a development of the circumference of the sign carrier.
Figure 5:
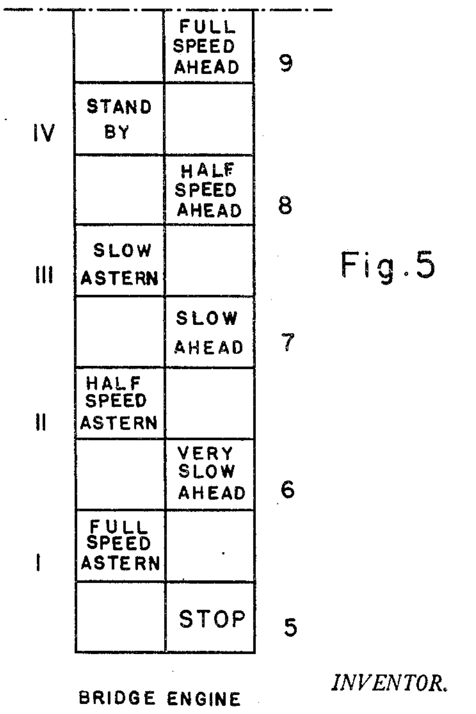

Figs. 4 and 5 show how the signs are arranged on the circumference of the command carrier, these signs being shown in Fig. 3 on the side face of the command carrier. Actually the dials of the telegraphs and the circumference of the command carrier will show the commands in words rather than in numerals or other symbols.

The left hand column of Fig. 4 and continued in Fig. 5 represents the commands originating from the bridge telegraph 11 whereas the right hand column represents the command repeats originating from the engine room telegraph. The signs on the columns are staggered so that in any position of the sign carrier only one sign is in recording position.

Figure 2:
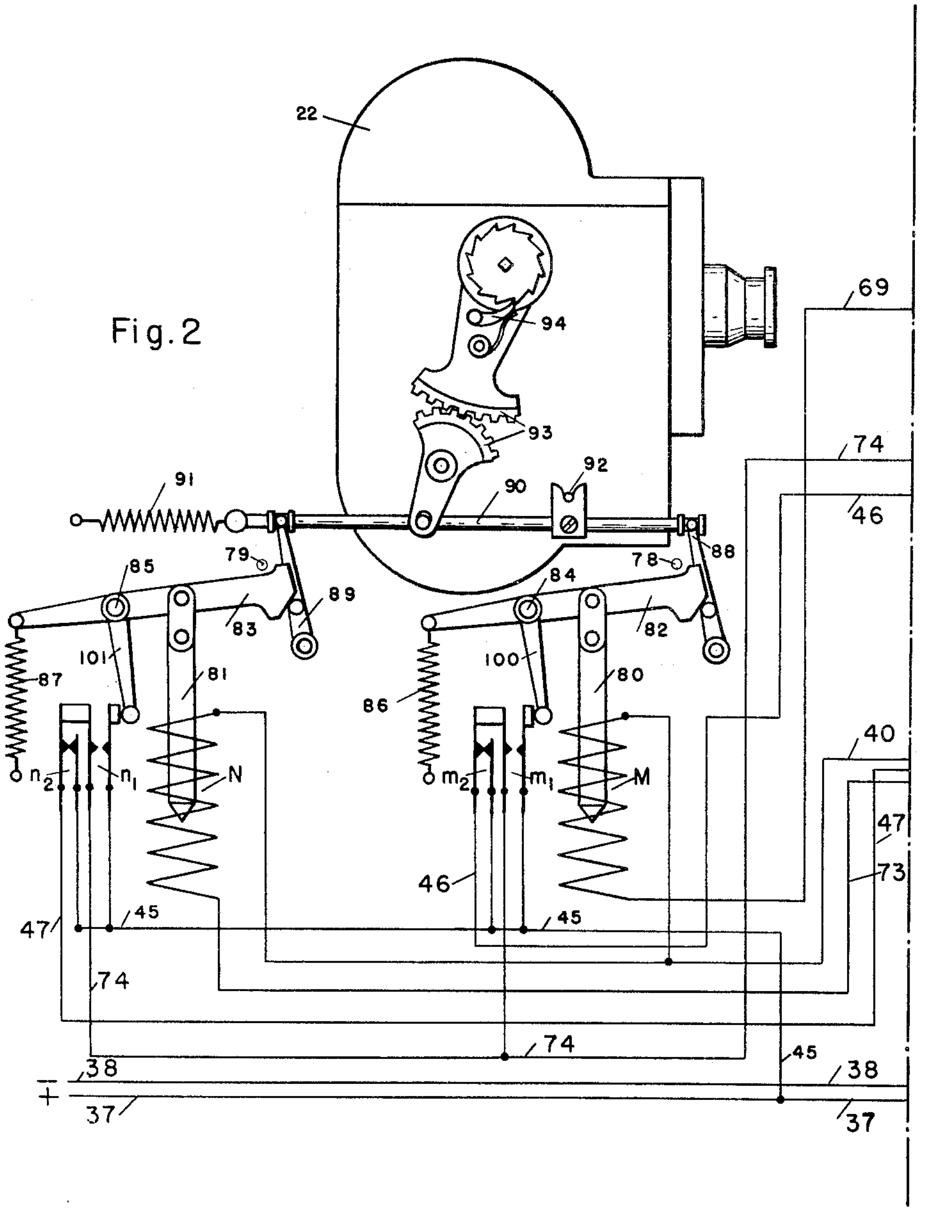
Figs. 2 and 3 are the contiguous parts of the circuit diagram of the recording device, Fig. 2 showing diagrammatically the photographic camera with its relays and Fig. 3 the telegraphs, the signal carrier, the step governors and followers with their control relays and circuits.
Figure 8:
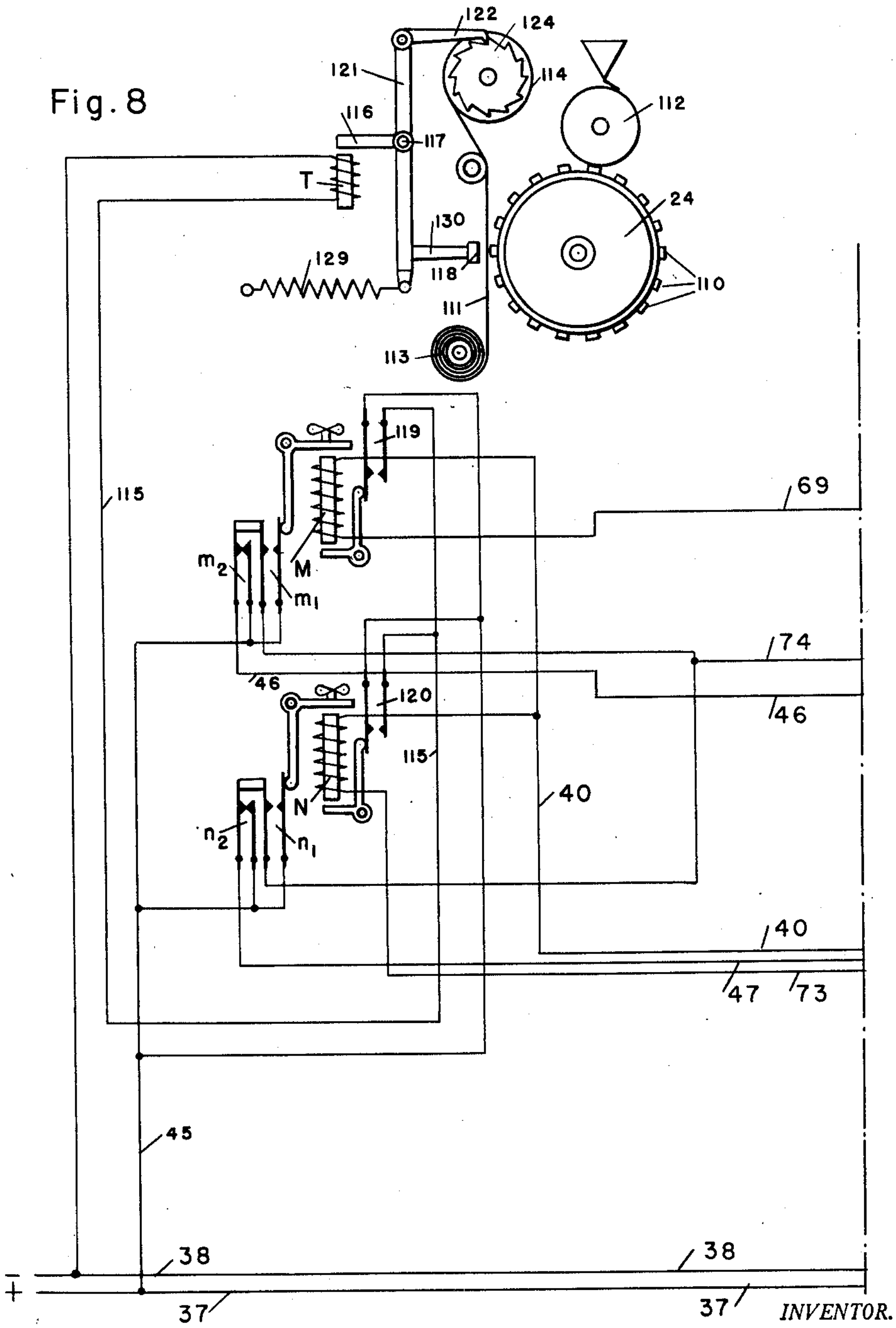
Fig. 8 is a modification of the circuit diagram of Fig. 2 showing diagrammatically a printing device as a recorder.

In the embodiment illustrated in Figs. 1 and 2, the recorder is a photographic camera, whereas in the embodiment of Fig. 8 the recorder is a printing device.

The signs on the command carrier are executed so as to be reproduceable by the recorder. In the case of a photographic camera the signs are photographically contrasting with the sign carrying surface, in case of a printer, they will be printing types.

In the embodiment illustrated, the control circuits will be energized by a network of direct current (±), with the supply lines 37, 38 from which the drive of the command carrier 24 is also energized. 25 is the motor driving the command carrier 24. An intermittent motion gearing is inserted between the shaft 27 of motor 25 and the shaft 26 of the command carrier 24. This gearing comprises a worm 28 and gear 29, a Maltese or Geneva gearing comprising cross 30 and cam disc 31, and spur gears 32, 33.

The transmission ratio of the meshing gears in relation to the motor speed is such that the Geneva drive arrests the command drum, during operation of the recording device, in recording position, image field of the camera or in front of the platen of a printer, for a length of time exceeding that necessitated for achieving the recording, such as the exposure time of the camera or the printing motion of a printer.

The control means for deriving from the movements of the telegraph indicators 14 and 18 the control movements for the recording process will now be described.

A step governor is associated with each telegraph, each step governor including a controller set comprising a starting controller A, D, a timing controller B, E, and a recording controller C, F, respectively.

In the recording device illustrated, where the control is operated electrically, the controllers may be arranged directly on the shafts of their appertaining telegraphs. When the control mechanism is a mechanical one the controllers may be arranged at any place of the telegraph cable, cable lengths thus being saved.

Each controller has a contact disc with contact bank $a_1$, $b_1$, $c_1$, $d_1$, $e_1$, $f_1$; contact segment $a_2$, $b_2$, $c_2$, $d_2$, $e_2$, $f_2$, and bridging contact lever $a_3$, $b_3$, $c_3$, $d_3$, $e_3$, $f_3$, each. The contact levers $a_3$, $b_3$, $c_3$, and $d_3$, $e_3$, $f_3$, are respectively coupled with the indicators 14 and 18 with which they are associated and thus follow their movements step by step.

The contacts $a_1$, $d_1$, of the starting controllers A and D are narrow and are disposed as to their positions to correspond to the transitions from command position to command position on the telegraphs. Since there are nine command steps on each telegraph, the contact banks $a_1$, $d_1$, will contain eight contacts each. The contacts of the other banks $b_1$, $e_1$, and $c_1$, $f_1$, nine on each, are disposed so that their positions correspond to the positions of the telegraph indicators. The contacts of the banks $b_1$, $e_1$, of the timing controllers B, E are narrow, whereas the contacts of the contact banks $c_1$, $f_1$, of the recording controllers C, F are wide enough to be bridged by the contact levers $c_3$, $f_3$, respectively, sliding over them.

With each of the controller sets there is associated a starting relay G, H; a timing relay K, L; and a recorder relay M, N, respectively. One terminal of the exciter coils of these relays is connected over lines 39, 40, respectively to the feed line 38 (−) of the network. The second terminals 41, 42 of the coils of the starting relays G, H and 43, 44 of the timing relays K, L are connected to the interconnected contacts of the contact banks $a_1$, $c_1$, and $b_1$, $e_1$, respectively, of the starting and timing controllers. Starting relays G, H each have three working contacts $g_1$, $g_2$, $g_3$, and $h_1$, $h_2$, $h_3$, respectively and the recorder relays each a working contact $m_1$, $n_1$, and a rest contact $m_2$, $n_2$. One contact piece each of the rest contacts $m_2$, $n_2$, is connected over line 45 to supply line 37 (+) and the other contact piece over holding lines 46, 47, respectively, to one contact piece of each of the working contacts $g_1$, $h_1$, of the starting relays. The second contact pieces of the working contacts $g_1$, $h_1$, are connected with the coil terminals 41, 42, respectively. Holding circuits (−) 37—45—$m_2$—46—$g_1$—41—coil G—39—38 (+) and (−) 37—45—$n_2$—47—$h_1$—40—42—coil H—39—38 (+) will thus be established when the working contacts $g_1$, $h_1$, close on movement of either contact lever $a_3$, $d_3$, out of any position and at the transition to the next position, and the respective coil G or H is excited through the closing of the corresponding of the following circuits: (−) 37—$a_3$—$a_2$—$a_1$—41—coil G—39—38 (+) or (−) 37—$d_3$—$d_2$—$d_1$—42—coil H—40—39—38 (+).

Either of the holding circuits will be kept closed until on exciting of the appertaining recorder coil M or N the respective rest contact $m_2$ or $n_2$ will open.

On movement of either contact lever $a_3$ or $d_3$, contact $g_2$ or $h_2$ as soon as closed, will start the motor over the following circuits: (−) 37—45—$m_2$—46—$g_2$—48—25—40—39—38 (+) or (−) 37—45—$m_2$—47—$h_2$—48—25—40—39—38 (+). Simultaneously a lighting circuit branch (48—49—lamps 50, 51—40) will be closed for illuminating the instrument panel or screen 20—between camera 22 and command carrier 24—through the window 21 of which the sign to be recorded appears.

With the starting of motor 25 the sign drum 24 will be rotated and will bring sign after sign into recording position behind the window 21 where each sign, through the action of the intermittent motion gearing 30, 31, will be arrested for a short length of time exceeding that necessitated for the recording.

If for instance motor 25 has a speed of 1500 R. P. M. and the worm gearing has a transmission ratio of 10 to 3, wheel 31 will rotate with 7.5 revolutions per second. The transmission ratio of spur gears 32 and 33 will be 18:1 (32 teeth to 144 teeth) corresponding to eighteen signs on command drum 24.

For each revolution of wheel 31 the Maltese cross 30 will be advanced one quarter of a revolution, of wheel 31, and will rest during the remaining three quarters of a revolution. Wheel 33 and with it the command drum 24 will thus be advanced by the Maltese cross one eighteenth of its circumference or one sign and then be arrested for three quarters of a revolution or one tenth of a second, whereas the exposure time of the camera will be one twentieth of a second.

With other recorders, other transmission ratios will be chosen to ensure proper recording operation.

The third working contacts $g_3$, $h_3$, respectively, connect the holding lines 46, 47 to the contact segments $b_2$, $e_2$ of the timing controllers B, E.

On movement of either telegraph indicator 14 or 18, levers $b_3$ and $e_3$ will move over the contact banks $b_1$ and $e_1$. Since the contacts of these banks correspond in their positions to the positions of the commands on the telegraph dials and since the contacts are narrow, at each passage of the contact lever of the timing controller over a contact—or of the appertaining telegraph indicator over a command position—a current pulse will be sent through the respective relay coil K or L. These relays are delayed action relays. When the appertaining telegraph indicator is shifted over its dial, these relays will therefore not respond and not close their working contacts $k$ or $l$ until the indicator has reached the final desired command position and rests on this position longer than the delay time of the relay, which time for instance may be three seconds. The respective relay K or L will then be kept excited as long as the holding circuit of the associated starting relay (G or H) and thus its working contact ($g_3$ or $h_3$) is closed.

On response of either relay K or L, the respective working contact $k$ or $l$ will connect the appertaining holding line 46 or 47 to the contact segment $c_2$ or $f_2$. Contact lever $c_3$ or $f_3$, whichever telegraph transmits signals will then bridge the appertaining contact segment $c_2$ or $f_2$ and that contact of bank $c_1$ or $f_1$, respectively, which corresponds in its position to the transmitted command or command repeat. From this contact the energizing of the appertaining relay M or N is controlled through means which are hereinafter designated as step followers, since they, following the step prescribed by the telegraph indicator, follow up and, when the desired sign stops in recording position, control the recording of the sign. These step followers, one for each telegraph, comprise each a contact drum 56, 57, mounted on shaft 26 of command wheel 24. The contact drums each are provided on their circumference with contacts on which a brush 58, 59, one for each drum, slides.

The contacts on the drums 56, 57, respectively, represent in their positions the various command positions on the telegraph dials 12, 16, or the corresponding contacts $c_1$, $f_1$ of the recording controllers. Each contact of the contact drum 56 is connected over a collector ring of the ring set 63 and a collector brush of the set 65 with a corresponding contact of contact bank $c_1$ and likewise the contacts of drum 57 over a collector ring of the ring set 64 and a collector brush of the set 66 with a corresponding contact of contact bank $f_1$.

The brushes 58, 59 are in the same spatial relationship with their appertaining revolving contact drums 56, 57, as the recording position is with the revolving sign carrier.

For instance, in the position shown in Fig. 3, sign carrier 24 may have been arrested by the intermittent motion drive with the sign "V," signifying "Stop," in recording position. Since indicator 14 on the bridge telegraph is in the corresponding command position, a corresponding contact of contact bank $c_1$ will be under the contact lever $c_3$, and the corresponding contact on contact drum 56 will be arrested under brush 58. A circuit will thus be closed which energizes the recorder relay M: (—) 38—39—40—relay coil M—line 69—closed rest contact $o_1$ of blocking relay O—line 70—brush 58—contact of contact drum 56—collector ring of set 63 connected with said contact of the contact drum—collector brush of set 65—corresponding contact of contact bank $c_1$—contact lever $c_3$—contact segment $c_2$—working contact $k$—line 46—rest contact $m_2$—line 45—37 (+).

As soon as relay coil M is energized, it will pull its armature 80 into the coil. Lever 82 pivotally connected with armature 80 will tilt about its pivot 84 and thus tilt lever 88 and push rod 90 to the right. This will cause actuation of the shutter releaser 92. The movement of rod 90 will also operate the gear sector pair 93 and thus cause the pawl 94 to slide loosely over a ratchet tooth. During this movement of rod 90, lever 89 will release lever 83 pivoted about pivot 85 and pivotally connected with the armature 81 of recorder relay N. The outward deflection of levers 82, 83 is limited by stops 78, 79, respectively.

Through the tilting of lever 82 about pivot 84, arm 100, secured on lever 82, will be tilted to the left and thus close working contact $m_1$ and immediately thereon open rest contact $m_2$ of relay M.

Closing of contact $m_2$ closes a circuit (+) 37—45—$m_1$—74—relay coil R—39—38 (—) and thus actuates relay R of a counter 97 mounted on screen 20 and thus advances the counter one step and counts the recording effected.

With the exposure a picture of screen 20 is taken through the window 21 of which the signal to be registered is visible. In addition to the counter 97, the screen may carry a time piece 98 with seconds hand indicating date and precise time of the exposure. The screen may also carry a tachometer 99 coupled with the engine shaft, and other data to be recorded together with the signal.

Opening of rest contact $m_2$ disconnects the holding line 46 from the network and thus deenergizes the starting relay G. With the deenergizing of the starting relay G, its working contacts $g_1$, $g_2$, $g_3$ are opened, the motor 25 and thus the drive of the sign carrier 24 is stopped, the lamps 50, 51 are switched off, the timing relay K and the recorder relay M are deenergized so that the command carrier drive and the relays are restored into their original rest position. Spring 86 will pull lever 82 into its rest position against stop 78. Spring 91 will therefore withdraw rod 90 into its rest position and thus operate ratchet 94 and advance the film and reset the shutter releaser for the next exposure.

A blocking relay O with two exciter coils $O_1$ and $O_2$ and a throw-over armature, is provided for blocking recording of the commands of the one telegraph when the commands of the other telegraph are being recorded and vice versa. Exciter coil $O_1$ is connected to, and thus under control of, the working contact $k$ of the timing relay K associated with the bridge telegraph. The other coil $O_2$ is connected with, and thus under control of, the working contact $l$ of the timing relay L associated with the engine room telegraph. The blocking relay O is provided with two rest contacts, one, $o_1$ in the circuit from brush 58 of step follower 56 over line 70 to line 69 and the coil of recorder relay M; the other rest contact, $o_2$ in the circuit from brush 59 of step follower 57 over line 71 to line 72 and over certain apparatus, to be described immediately, to line 73 and the coil of recorder relay N. Thus when one of the timing relays K or L responds on operation of the telegraph associated with it, the respective coil $O_1$ or $O_2$ will be energized and the rest contact, $o_2$ or $o_1$, within the recording circuit associated with the other telegraph, opened.

Consequently, when a command is transmitted from the bridge telegraph, once the timing relay K has responded, the circuit leading to the recorder relay N associated with the engine room telegraph will remain disconnected until the recording of the bridge telegraph command had been completed, and vice versa. It is thus prevented that two commands, one given immediately after the other, might be recorded in the wrong order.

When, thereafter, the command is repeated from the engine room telegraph, the holding circuit over holding line 47 controlled by the rest contact $n_2$ of the recorder relay N will be closed, once the indicator 18 and thus control lever $d_3$ had been moved from one position to the next and the starting relay H had been energized. In this way the command repeated from the engine room telegraph, until after completion of the recording of the bridge command, is stored. After completion of the recording of the bridge command, when contact $o_2$ of the blocking relay O has again been closed and revolving sign carrier has brought the command sign, e. g. "5," corresponding to the bridge command, into the recording position and the collector drum 57 the corresponding contact under the brush 59, the energizing circuit for the recorder relay will be closed and thus the stored command be recorded. Circuit: (+)37—45—$n_2$—47—working contact l of timing relay L—$f_2$—$f_3$—$f_1$—collector ring brush 66—collector ring 64—contact of contact drum 57—brush 59—line 71—rest contact $o_2$ of blocking relay O—72 . . . 73—coil of relay N—40—39—38(—).

The recorder relay N will pull lever 83, tiltable about its pivot 85, into the coil and thus push arm 89 with rod 90 to the right and operate the photographic camera 22 as hereinbefore described in connection with the operation of the recorder relay M.

In order to ensure that a command repeated from the engine room telegraph will not be recorded before it has actually been executed, the step governor associated with the engine room telegraph may include a maneuver checking device. The step governor, to this purpose, comprises a fourth controller, here designated as "maneuver check controller," P, with contact bank $p_1$, contact segment $p_2$, and rotary contact lever $p_3$, coupled with or on the shaft of the indicator 18 of the engine room telegraph.

A maneuvering controller Q is coupled with or mounted on the shaft of the maneuvering organ, hand wheel 104 of the engine. The maneuvering controller Q has a rotary contact lever $q_3$ and two contact banks $q_1$ and $q_2$ with the contacts of both juxtaposed in pairs so as to be bridged pair by pair by the contact lever $q_3$. The contacts of bank $q_1$ are connected with the contacts of the bank $p_1$ of the maneuver check controller P and the contacts of the other bank $q_2$ are connected with one another to a common terminal 105 to which line 73 is connected which leads to the coil of the recorder relay N, whereas contact segment $p_2$ is connected to line 72. In this way the connection between brush 59 of step follower drum 57 and the coil of recorder relay N is blocked until the position of contact lever $q_3$, or the position of the maneuvering organ 104 agrees with the position of contact lever $p_3$ and thus with the position of the indicator 18 of the engine room telegraph.

As long as these positions do not agree with one another, a signal lamp 106 in the engine room is lighted through a branch line leading from (—)38—106—rest contact $s$ of a relay S—line 76—over a fourth working contact $h_4$ of the starting relay H to holding line 47. As soon as the maneuvering controller Q and the maneuvering check controller P are in agreeing positions, the coil of relay S will be energized from terminal 105 and line 40. Rest contact $s$ will open and thus disconnect the signal lamp 106.

In the modification of Fig. 8 in which a printing device is employed as recorder, the command carrier 24 is provided on its circumference with printing types for printing the commands and command repeats on a paper band 111. 112 is an inking device, 113 the feeding paper reel from which the band is drawn stepwise on a receiving roller 114.

When one of the recorder relays M or N is energized, as described hereinbefore, the closing working contact 119 or 120 of this relay will connect, over line 115, the coil of relay T to line 38(—) the other contact piece of the relay contact 119 or 120 being connected to 37(+) over line 45. The printing relay T will thus be energized. Its armature 116 will be oscillated about its pivot 117 against the tension of a spring 129, and the armature arm 130 will press the platen 118 against the recording strip 111, and the types 110, and will thus print the signal arrested in the recording or printing position. With the same movement of armature 116, its arm 121 will move the pawl 122 loosely over one tooth of the ratchet wheel 124.

When, through the opening of the respective rest contact $m_2$ or $n_2$, the holding line 46 or 47 will be disconnected and the recorder relay M or N de-energized, as described hereinbefore, the coil of the printing relay T will be de-energized. Spring 129 will draw armature 116 into its rest position and at the same time the pawl 122 will advance the ratchet wheel 124 one tooth, and thus bring the paper band into position for the next printing.

The installation as described may be employed for ships with a single propeller, with a single bridge telegraph or a pair of coupled telegraphs.

For ships with double propellers with uncoupled starboard and backboard installations, two independent recording devices may be employed, the counters for the recordings being coupled with each other, so that the recordings are counted continuously on both recording strips or films.

A single recording device may also be employed in this case by doubling the commands on the command carrier and adding the designations SB (starboard) or BB (backboard) to each command. The number of the timing relays and starting relays will also be doubled (four of each instead of two), the recording however is made on a single recording band.

The recording device, viz. the recorder, the command carrier, its motor and drive, the step followers, the various relays and their control circuits may be assembled in a common casing or housing, the instrument panel or screen 21 forming a partition therein which separates the photographic camera or other recorder from the rest of the device. Through a proper observation window in the wall of the casing the instruments especially the counter may be observed. In this way the number of recordings or registrations already made on the recording strip may be controlled.

I claim:

1. In a ship's telegraph installation having a bridge telegraph and an engine room telegraph associated with each other, each with a dial graduated so as to mark various positions corresponding to the various commands, and with an indicator adapted to be shifted over and set into any of said various positions so as to indicate the respective command, a recording device with a recorder and a command carrier carrying signs reproduceable by said recorder and representing the commands transmitted from said bridge telegraph and the command repeats transmitted from said engine room telegraph; driving means, separate from and independent of the shifting means of said indicators, for driving said carrier and bringing thereby said signs successively into recording position, and control means for controlling said driving means dependent upon the shifting of said indicators and adapted to start said drive on movement of either indicator of said telegraphs, and, on completion of the indicator movement and when said indicator has reached the desired command position and the corresponding sign on said carrier has been brought by said drive into recording position, to actuate said recorder, and thereon to reset said drive and said control means into their original rest position, thus recording in their order said commands and said command repeats.

2. In a ship's telegraph installation having a bridge telegraph and an engine room telegraph associated with each other, each with a dial graduated so as to mark various positions corresponding to the various commands, and with an indicator adapted to be shifted over and set into any of said various positions so as to indicate the respective command, a recording device with a recorder and a command carrier carrying signs reproduceable by said recorder and representing the commands transmitted from said bridge telegraph and the command repeats transmitted from said engine room telegraph; driving means, separate from and independent of the shifting means of said indicator, for driving said carrier and bringing thereby said signs successively into recording position, step governors coupled with said bridge telegraph and with said engine room telegraph, one each, said step governors having control circuits connected therewith and control means adapted to be operated thereby under the control of said step governors, said control means being adapted to start said driving means on movement of either of said indicators; actuating means associated with said recorder and connected to said control circuits and adapted to actuate said recorder under the control of said control means; step followers connected to said control circuits and adapted to be operated thereby under the control of said step governors, and further adapted, on completion of the indicator movement, and, when said indicator has reached the desired command position and the corresponding sign on said command carrier has been brought by said drive into recording position, to cause said control means to actuate said recorder and thereon to reset said recorder in readiness for the next operation, and reset said drive and said control means into their original rest positions, thus recording in their order said commands and said command repeats.

3. In a ship's telegraph installation having a bridge telegraph and an engine room telegraph associated with each other, each with a dial graduated so as to mark various positions corresponding to the various commands, and with an indicator adapted to be shifted over and set into any of said various positions so as to indicate the respective command, a recording device with a recorder, a recording band being associated with said recorder, a rotary carrier carrying signs representing the commands transmitted from said bridge telegraph and the command repeats transmitted from said engine room telegraph; said recording device including, a drive, separate from and independent of the shifting means of said indicators, for rotating said carrier, an intermittent motion gearing between said drive and said carrier adapted to bring said signs successively into the recording position and to arrest them therein transitorily during operation of said drive; step governors coupled with the indicator of said bridge telegraph and said engine room telegraph each, so as to follow step by step the movements thereof; said step governors each having control circuits connected therewith and control means adapted to be operated thereby under the control of said step governors, said control means being adapted to start said driving means on movement of either of said indicators; recorder actuating means and means for advancing said recording band, said advancing means associated with said recorder and adapted to be actuated by said control means; step followers connected to said control circuits and adapted to be operated thereby under the control of said step governors, and, on completion of the indicator movement and when said indicator has reached the desired command position and the corresponding sign on said rotary carrier has been brought into said recording position, to cause said control means to actuate and thereon to reset said recorder actuating means, to advance said recording band into readiness for the next recording and reset said drive and said control means into their original rest positions and thus recording in their order said commands and said command repeats.

4. In a ship's telegraph installation, a recording device as set forth in claim 3 wherein said intermittent motion gearing between said rotary sign carrier and said drive includes a Geneva gearing and has a transmission ratio in relation to the speed of said drive so as to arrest during operation of the device each sign in said recording position for the length of time exceeding the time necessitated for the actuation of said recorder.

5. In a ship's telegraph installation having a bridge telegraph and an engine room telegraph associated with each other, each with a dial graduated so as to mark various positions corresponding to the various commands, and with an indicator adapted to be shifted over and set into any of said various positions so as to indicate the respective command, a recording device for recording in their order the commands transmitted from said bridge telegraph and the command repeats transmitted from said engine room telegraph; said recording device comprising a film camera, a rotary carrier carrying signs representing said commands and said command repeats, a drive, separate from and independent of the shifting means of said indicators, for rotating said carrier, an intermittent motion gearing between said drive and said carrier adapted to bring said signs successively into the image field and the focus of said camera and to arrest them therein transitorily during operation of said drive; step governors coupled with the indicator of said bridge telegraph and said engine room telegraph each, so as to follow step by step the movements thereof; said step governors each having control circuits connected therewith and control means adapted to be operated thereby under the control of said step governors, said control means being adapted to start said driving means on movement of either of said indicators, actuating means for releasing and resetting the shutter of said camera and means for advancing the film thereof, said actuating means and advancing means adapted to be actuated by said control means; step followers connected to said control circuits and adapted to be operated thereby under the control of said step governors, and, on completion of the indicator movement and when said indicator has reached the desired command position and the corresponding sign on said rotary carrier has been brought into said image field, to cause said control means to release and thereon to reset said shutter, to advance said film into readiness for the next exposure and reset said drive and said control means into their original rest positions.

6. In a ship's telegraph installation, a recording device as set forth in claim 5 wherein a screen is disposed in said image field and in front of said rotary sign carrier, said screen having a window of a size to permit exposure of only one sign at a time when said sign is in recording position in said image field.

7. In a ship's telegraph installation, a recording device as set forth in claim 5 wherein a screen is disposed in said image field and in front of said rotary sign carrier, said screen having a window of a size to permit exposure of only one sign at a time when said sign is in recording position in said image field; wherein further a tachometer coupled with the engine shaft, a time piece indicating time and date of the exposure and a counter for counting the exposures are disposed in said image field of the camera so as to be recorded by said camera together with said telegraph commands.

8. In a ship's telegraph installation having a bridge telegraph and an engine room telegraph associated with each other, each with a dial graduated so as to mark various positions corresponding to the various commands, and with an indicator adapted to be shifted over and set into any of said various positions so as to indicate the respective command, a recording device for recording in their order the commands transmitted from said bridge telegraph and the command repeats transmitted from said engine room telegraph; said recording device comprising a recorder, a recording band associated with said recorder, recorder actuating means, and band advancing means, a rotary carrier carrying signs representing said commands and said command repeats, a drive for rotating said carrier, an intermittent motion gearing between said drive and said carrier adapted to bring said signs successively into recording position, opposite said recording band, and to arrest them therein transitorily during operation of said drive; a step governor associated with each of said telegraphs, each step governor including a controller set comprising a starting controller, a timing controller, and a recording controller, each controller having a contact disc with contact bank and a rotary contact lever adapted to slide over the contacts of said contact banks and coupled with the respective indicator to follow the movement of same step by step, the contacts of said starting controllers disposed as to their positions to correspond to the transitions from command to command on said telegraphs, the contacts of the contact banks of the timing controllers and the recording controllers disposed as to their positions to correspond to the graduations of said telegraph dials; said device further including, associated with said controller sets and recorder actuating means, a starting relay, a timing relay, and a recorder relay for actuating and resetting said recording device.

9. In a ship's telegraph installation, a recording device as set forth in claim 8 wherein a blocking relay is provided with two exciter coils and a throw-over armature, one of said exciter coils being connected to and under the control of the working contact of the timing relay of said bridge telegraph, the other of said exciter coils being connected to and under the control of the working contact of the timing relay of said engine room telegraph for blocking, when one of said telegraphs is operated, the recorder relay associated with the other of said telegraphs.

10. In a ship's telegraph installation, a recording device as set forth in claim 8 wherein said step governor associated with said engine room telegraph also includes a maneuver check controller with a contact bank and a rotary contact lever coupled with the indicator of said engine room telegraph; a maneuvering controller coupled to the maneuvering organ of the engine, said maneuvering controller having a rotary contact lever and two contact banks with the contacts of both banks juxtaposed in pairs so as to be bridged pair by pair by said rotary lever, the contacts of one of said banks being connected to the contacts of the banks of said maneuver check controller and the contacts of the other of said banks being connected to a common terminal, both said maneuvering controller and said maneuver check controller being inserted by means of said terminal and the contact of said rotary contact lever of said maneuver check controller into the control circuit of the recorder relay associated with said engine room telegraph, thereby to block said control circuit as long as the position of said maneuvering organ does not correspond to the position of said engine room telegraph.

11. In a ship's telegraph installation, a recording device as set forth in claim 8 wherein said recorder is a photographic film camera, said command carrier being disposed, with the sign in recording position, in the image field and the focus of said camera, said recording band being the film of said camera; actuating means for releasing and resetting the shutter of said camera and for advancing said film; said recorder relays having armatures associated with said shutter releasing and resetting means and film advancing means, thereby, on operation of said recorder relays, to actuate said shutter when said sign on said command carrier is in position in said image field, to actuate and thereon to reset said shutter actuating means and advance said film into readiness for the next exposure.

12. In a ship's telegraph installation, a recording device as set forth in claim 8 wherein said recorder is a printer and said command carrier carries the signs in printing types; said printer having a paper band associated therewith and disposed in front of said command carrier in recording position, paper advancing means associated with said paper band; a printing relay being associated with said recorder relays and adapted to be controlled thereby, said printing relay having an armature carrying a printing platen adapted, when said sign on said command carrier is in recording position and said printing relay is energized under control of either recorder relay, to be pressed against said paper band and said sign in recording position; said armature further carrying a pawl, said paper advancing means including a ratchet wheel adapted to be operated by said pawl when the printing operation has been completed and said printing relay de-energized, thereby to advance said paper band for the next recording.

13. A recording device as set forth in claim 8 wherein the exciter coils of said starting, timing, and recorder relays are connected with one of their terminals to a source of electricity, the other terminals of the coils of the starting and timing relays being connected to the dial contacts of said starting controllers and timing controllers, respectively; said starting relays each having working contacts, said recorder relays having a rest contact each, a holding line connecting across said rest contacts a source of electric current with one terminal of each of said working contacts of the starting relays, said holding line being connected to the other terminals of the exciter coils of the starting relays for thus establishing a holding circuit for each of said starting relays.

14. A recording device as set forth in claim 13 wherein a supply circuit is provided for said drive, a working contact of each of said starting relays being inserted into said supply circuit and adapted to close the same whenever at the start of its movement the respective of said indicators passes from one command position to the next; third working contacts of said starting relays connecting said holding lines to the respective contact levers of said timing controllers.

15. A recording device as set forth in claim 8 wherein the exciter coils of said starting, timing, and recorder relays are connected with one of their terminals to a source of electricity, the other terminals of the coils of the starting and timing relays being connected to the dial contacts of said starting controllers and said timing controllers, respectively; said starting relays each having working contacts, said recorder relays having a rest contact each, a holding line connecting across said rest contacts a source of electric current with one terminal of each of said working contacts of the starting relays, said holding line being connected to the other terminals of the exciter coils of the starting relays for thus establishing a holding circuit for each of said starting relays; said timing relays being delayed action relays having a working contact connecting said holding line to the lever contact of the respective of said recording controllers when the indicator of the appertaining of said telegraphs rests in a command position for a length of time exceeding that of the delayed action timing relay.

16. A recording device as set forth in claim 8 wherein a recorder relay is associated with said recorder actuating means and said recording band advancing means and is adapted to release said actuating means and thereon to reset the same and advance said recording band into readiness for the next recording.

17. A recording device as set forth in claim 8 wherein a recorder relay is associated with said recorder actuating means and said recording band advancing means and is adapted to release said actuating means and thereon to reset the same and advance said recording band into readiness for the next recording and wherein two step follower contact drums are disposed on the shaft of said rotary sign carrier, one for each of said telegraphs, each of said contact drums having contacts disposed as to their positions in correspondence with the signs on said carrier and the commands on the respective telegraph associated therewith, said contacts being connected electrically to the corresponding contacts of the recording controller associated therewith, and a brush disposed in sliding contact with each of said contact drums and electrically connected to the free end of the exciter coil of the respective of said recorder relays associated therewith; thereby, when the sign, corresponding to the given command, on said carrier is in recording position, to actuate and thereon to reset said actuating means and advance said recording band into readiness for the next recording, and restore said relays and said drive into their original rest positions.

JOHANNES LAMMERS.

REFERENCES CITED

The following references are of record in the file of this patent:

UNITED STATES PATENTS

| Number | Name | Date |
|---|---|---|
| 885,528 | Rush | Apr. 21, 1908 |
| 991,504 | Henkle | May 9, 1911 |
| 1,787,066 | Carter et al. | Dec. 30, 1930 |
| 2,091,768 | Noble | Aug. 31, 1937 |
| 2,336,081 | Finnegan et al. | Dec. 7, 1943 |
| 2,438,331 | Callahan | Mar. 23, 1948 |